United States Patent [19]

Clymer

[11] Patent Number: 4,518,866
[45] Date of Patent: May 21, 1985

[54] METHOD OF AND CIRCUIT FOR SIMULATING NEURONS

[75] Inventor: Roy E. Clymer, Columbia, Md.

[73] Assignee: Psychologics, Inc., Columbia, Md.

[21] Appl. No.: 425,765

[22] Filed: Sep. 28, 1982

[51] Int. Cl.³ .................................................. G06F 15/42
[52] U.S. Cl. ........................................ 307/201; 307/306; 364/900
[58] Field of Search ........................... 307/201, 306; 364/900 MS File

[56] References Cited

U.S. PATENT DOCUMENTS

| | | | |
|---|---|---|---|
| 3,103,648 | 9/1963 | Hartmanis | 307/201 |
| 3,165,644 | 1/1965 | Clapper | 307/201 |
| 3,218,475 | 11/1965 | Hiltz | 307/201 |
| 3,250,918 | 5/1966 | McGrogan, Jr. | 307/201 |
| 3,273,125 | 9/1966 | Jakowatz | 307/201 |
| 3,310,784 | 3/1967 | Hilinski | 307/201 |
| 3,311,895 | 3/1967 | Clapper | 307/201 |
| 3,324,457 | 6/1967 | Ogle et al. | 307/201 |
| 3,341,821 | 9/1967 | Kessler | 307/201 |
| 3,351,773 | 11/1967 | Wolf et al. | 307/201 |
| 3,351,783 | 11/1967 | Harris et al. | 307/201 |
| 3,414,735 | 12/1968 | Harris et al. | 307/201 |
| 3,476,954 | 11/1969 | Wennik et al. | 307/201 |
| 3,496,382 | 2/1970 | Hendrix | 307/201 |
| 3,548,202 | 12/1970 | Ide et al. | 307/201 |
| 3,568,075 | 3/1971 | Dusheck, Jr. et al. | 307/201 |
| 3,601,811 | 8/1971 | Yoshino | 364/900 |
| 3,602,888 | 8/1971 | Nishiyama et al. | 364/900 |
| 3,638,196 | 1/1972 | Nishiyama et al. | 364/900 |
| 3,691,400 | 9/1972 | Askew | 307/201 |
| 3,701,974 | 10/1972 | Russell | 364/900 |
| 3,950,733 | 4/1976 | Cooper et al. | 307/201 |
| 4,163,983 | 8/1979 | Cline et al. | 307/201 |
| 4,254,474 | 3/1981 | Cooper et al. | 364/900 |

OTHER PUBLICATIONS

Hay et al., "The Mark 1 Perceptron—Design and Performance", IRE Proceedings, Int'l Conv., Record 8, part 2, 1960, pp. 78–87.

Rosenblatt, "Perceptron Simulation Experiments", Proceedings of the IRE, Mar., 1960, pp. 301–309.

*Primary Examiner*—Stanley D. Miller
*Assistant Examiner*—D. R. Hudspeth
*Attorney, Agent, or Firm*—Jones, Tullar & Cooper

[57] ABSTRACT

Circuitry for and a method of simulating neurons are disclosed. The circuitry for a neuron includes a synapse formed of two up/down counters and other logic circuitry. The counters combine to generate a four-bit number which represents the amplitude of the synaptic potential, which amplitude is increased upon receipt of an input pulse, and which decays over a period of time. If a fixer signal is received, representing an external event (which may be an output from other neurons), the decay will be halted, thereby fixing the synaptic potential at a different value.

The output of the synapse is fed to a generator, which comprises counters and other logic circuitry for accumulating the received synapse output signals and which continuously counts back to a rest value, to thereby replicate the temporal summation capability of a neuron.

When the value accumulated in the generator exceeds a threshold value, an output signal is generated, representing the firing of the neuron. This output signal may be used as a fixer signal to control the operation of synapses to thereby regulate other neurons or effector mechanisms, such as servomotors.

12 Claims, 10 Drawing Figures

METHOD OF AND CIRCUIT FOR SIMULATING NEURONS

BACKGROUND OF THE INVENTION

The present invention relates generally to artificial neurons, and more particularly to a method and circuitry for closely simulating both the known and theoretical functioning of a biological neuron and more importantly, for simulating the neuron's function of learning.

A neuron is a single nerve cell and is the basic building block of the biological nervous system. Each individual neuron is adapted to receive stimuli in the form of electrical pulses from various sources including other neurons and receptor sense organs such as the eyes and ears. Neurons receive these stimuli through their inputs, which are called synapses, and respond to these stimuli by generating electrical output signals in the form of pulses which may in turn be utilized as stimuli to other neurons or to control effector organs such as muscles.

In the past, attempts have been made to simulate the behaviour of neurons with electronic circuitry. As an example of such a circuit, U.S. Pat. No. 3,351,773, to Wolf et al, discloses an artificial neuron circuit which, like actual neurons, has a plurality of inputs, or synapses, the potential of which are summed together and cause the neuron to generate an output, or "fire", if and when their sum exceeds a certain threshold potential. However, in order properly to simulate the operation of an actual neuron, the artificial neuron must exhibit the ability to learn. As will be shown later, biological neurons learn by altering the manner in which they react to stimuli according to a variety of temporal and spatial parameters. The artificial neuron set forth by Wolf does not have this ability and as such, is not capable of learning.

There have been attempts at devising artificial neurons which do possess a learning ability. One such neuron device is disclosed in U.S. Pat. No. 3,496,382, to Hendrix. This patent sets forth a neuron circuit in which the threshold potential of the neuron is alterable, depending upon whether action which results when the neuron fires is desirable or undesirable. Specifically, if the firing of the neuron causes a desirable action, the neuron's threshold will be lowered so that it can more easily fire, whereas if this action is undesirable, the threshold of the neuron will be raised so that it will be less likely to fire.

Although the Hendrix patent attempts to simulate the learning function of a neuron, the circuit, like that of the Wolf patent, suffers drawbacks. As will be shown, the actual process by which a neuron learns is very complex and the simple manner in which the Hendrix patent attempts to replicate it by varying the threshold potential does not provide an accurate simulation of this important function of a neuron.

SUMMARY OF THE INVENTION

It is therefore an object of the present invention to apply a theory by which biological neurons learn and to a method and apparatus for simulating the same.

Another object of the present invention is to provide an artificial neuron which closely replicates the theoretical behavior and learning ability of biological neurons and which can be formed entirely of integrated circuits so that it can be easily reduced to a single chip.

It is yet another object of the present invention to provide a method for simulating the operation of a biological neuron which can be carried out in program form on a digital computer.

A still further object of the present invention is to provide an artificial neuron which, when interconnected with other similar neurons and appropriate sensing and effectory devices, provides behavioral control and learning ability which is similar to that observed in organisms.

Another object of the invention is to provide a neuron simulator which when used with suitable transducers could directly interact with biological neurons, and thus would constitute a true artificial neuron.

As stated above, neurons are responsive to a number of stimuli and receive these stimuli through inputs which are known as synapses. When an individual synapse receives a pulse from its corresponding source of stimulus, the synapse generates a potential which may vary in magnitude and may be either positive or negative in sign depending on whether the synapse is excitatory or inhibitory. Excitatory synapses are those which will tend to bring the neuron closer to firing while inhibitory synapses are those which tend to prevent a neuron from firing. The synaptic potentials which are generated as the result of an input pulse are sent to a portion of the neuron which is called the generator. The generator sums all incoming synaptic potentials and if this sum exceeds a positive threshold level, an output signal will be generated. This generation of an output signal is known as the "firing" of the neuron.

The process by which synaptic potentials from various synapses are summed to generate neuron firing is called spatial summation. However, the synaptic potential generated by an input stimulus persists for a short period after the occurrence of the input stimulus. This fact gives rise to a second means of producing cell firing, temporal summation. In temporal summation, firing may be the result of a series of inputs at a single synapse. If subsequent inputs arrive at a synapse before the earlier synaptic potentials have fully decayed, then the sum of the new potential and the potential remaining from an earlier input may exceed threshold and cause the neuron to fire. The firing of biological neurons is the result of the interplay of spatial and/or temporal summation.

The above described traits of neuron operation are those which are known to exist. Organisms, however, are also capable of learning and although it is known that in order to learn the organism's neurons must be able to change the way they respond to their various stimuli (i.e., must be able to make them more or less effective), the exact mechanism by which this occurs is not known. A theory for this learning process, however, which forms the basis for the present invention and which is known as synaptic modulation, is set forth in the paper "The Neuronal Basis of Memory: A theoretical Proposition and Review" by Roy E. Clymer and H. Scott Swartzwelder. (Copies available from H. S. Swartzwelder at the Center for Alcohol Studies, UWC Medical School, Chapel Hill, North Carolina, 27514.) According to this theory, it is the temporal and spatial associations among stimuli that are extracted from the environment by animal nervous systems and used by them to guide behavior. Thus, for example, when one of Pavlov's dogs comes to salivate to the buzzer in anticipation of being fed, it is because his nervous system has detected the temporal relationship between one stimulus, the buzzer, and another, food. This association among stimuli is the basis for a change in behavior which benefits the animal.

The specifics of the theory of synaptic modulation as applied to neuron operation and the manner in which this operation leads to the behavior modifications which are noted, for example, in the famous experiments with Pavlov's dogs, may be explained as follows. Initially, when an input pulse is detected, each synapse of a neuron will generate a synaptic potential of a certain magnitude, and can therefore be characterized by a synaptic efficacy. If the synaptic efficacy changes, inputs (which do not change) will produce synaptic potentials with a correspondingly changed magnitude. The theory of synaptic modulation states, however, that if the neuron is caused to fire within a certain time interval following the detection of the input pulse, the magnitude of the individual synaptic efficacy corresponding to that input will be increased. The amount of this increase is a function of three variables: (a) the point in the time interval when the neuron fires; (b) the present magnitude of the efficacy; and (c) an upper limit which is placed on the magnitude of that efficacy. This increase in magnitude is temporary, however, and the synaptic efficacy immediately begins to decrease exponentially back to its original value. It should be noted that a separate time interval is initiated for the arrival of each input pulse at each synapse and, therefore, each synapse is individually modifiable.

When the neuron fires, some action may occur and this action will have an outcome. If the outcome of that action is judged desirable by the organism, the theory of synaptic modulation states that a positive fixer signal will occur which will tend to halt the decay in efficacy of any excitatory synapses which have recently had their efficacies increased as described above. Again, the exact level at which the synaptic efficacy will be fixed is a function of three variables: (a) the strength of the fixer signal; (b) the present lower limit on the synaptic efficacy (its value before being increased); and (c) the upper limit on the synaptic efficacy. The strength of the fixer signal is a function of the level of desirability of the outcome. In a similar fashion, if the outcome which results when the neuron fires is undesirable, a negative fixer signal will occur which will halt the decay of any inhibiting synapses which have just recently had their efficacies increased.

As a simple application of this theory of a neuron operation to behavior modification and learning, the example of Pavlov's dogs may be used. In those experiments, a dog was conditioned to expect to be fed after hearing a buzzer. In anticipation of being fed, the dog began to salivate. Initially, only the actual appearance of the food was sufficient to cause the dog to salivate. Eventually, after repeated conditioning, the dog began to salivate at the sound of the buzzer even in the absence of any food. This behavior may be explained using the theory of synaptic modulation as follows.

Both the appearance of food and the sound of the buzzer represent inputs to a neuron in the dog's brain, the firing of which causes him to salivate. Initially, only the appearance of food is capable of generating a synaptic potential which is strong enough to cause the neuron to fire and thereby make the dog salivate. If, however, each sounding of the buzzer is quickly followed by the appearance of food, the synaptic efficacy corresponding to the buzzer input will be raised when the neuron fires due to the appearance of the food. In addition, because food represents a positive reinforcement to the dog, (assuming that he is hungry), a positive fixer signal will occur when the dog begins to eat. This fixer signal will tend to halt the decay of the synaptic efficacy corresponding to the buzzer input. If this experiment is repeated over and over, eventually the synaptic efficacy corresponding to the buzzer input will be raised high enough that it alone will provide sufficient stimulus to cause the dog to salivate. Thus, the observed behavior of Pavlov's dogs may be explained by the theory on which the present invention is based.

The circuitry which forms the preferred embodiment of the present invention and simulates the behavior of a neuron according to the theory of synaptic modulation is digital and the neuron's synaptic potentials or values, which in actuality are analog signals, are represented in the circuit by binary numbers. The neuron is comprised of two basic component parts: a synapse and a generator. The synapse is formed generally of two up/down counters, a comparator, and two buffer registers. Very generally, the up/down counters combine to generate a four-bit number, the value of which represents the amplitude of the synaptic potential. The counters are interconnected and clocked in such a manner that their combined output simulates synaptic modulation; that is, if the neuron's generator fires shortly after the synapse receives an input pulse, the magnitude of the synaptic efficacy will be increased according to a number of variables, as stated previously. This efficacy will then begin to decay back to its original value. One of the buffer registers and the comparator serve to halt this decay either at a higher level if a fixer signal is received or at the original (rest) level if no fixer signal is received. It should be noted that in the preferred embodiment of the invention, wherein digital circuitry is used, the fixer signal is a digital pulse. As such, it is not of variable amplitude as is the case for the fixer signal according to the theory of synaptic modulation. This limitation does not, however, adversely affect the ability of the circuit properly to simulate the theory of synaptic modulation.

The second buffer register of the synapse circuit serves simply to gate the number which is the combined output of the up/down counters onto a data bus which leads to the neuron's generator. This number, the synaptic potential, is placed on the data bus whenever the synapse receives an input pulse. Thus the number placed on the bus, the synaptic potential, depends on the value of the up/down counter, i.e., on the synaptic efficacy at the time an input pulse arrives.

The generator is comprised generally of an up/down counter, an adder, a buffer register, and assorted gates and flip flops. Incoming signals (in the form of binary numbers) arrive by way of the data bus and are added by means of the adder and the buffer register to the number currently being held in the up/down counter. The up/down counter thus serves as an accumulator for the input synapse signals, and operates continuously to count the number currently being held back to its rest value. This portion of the circuitry replicates the neuron's temporal summation capability.

The direction in which the up/down counter counts is determined by the algebraic sign of the number, or value, currently accumulated in the counter (up if negative and down if positive) and is controlled by logic circuitry which monitors the signs of incoming data from all the synapses, the sign of the number in the generator, and the carry bit.

When the accumulated value in the generator exceeds a positive threshold value, which in the case of the four-bit generator of the preferred embodiment is 15 (1111), a flip flop is triggered by the carry bit of the adder to cause a train of pulses to be generated in the output line. The number of output pulses generated by the flip flop is determined by the amount by which the generator value has exceeded threshold. Thus, if threshold is exceeded by a large amount, a large number of pulses will be generated, whereas if threshold is exceeded by only 1, then only 1 pulse will be generated. These output pulses represent the firing of the neuron and are utilized to control the operation of the synapses, as described previously, and to control the operation of other neurons and effector mechanisms such as servo motors.

BRIEF DESCRIPTION OF THE DRAWINGS

The foregoing additional objects, features and advantages of the present invention will become apparent from a consideration of the following detailed description of the preferred embodiment thereof taken in conjunction with the accompanying drawings in which.

DETAILED DESCRIPTION OF A PREFERRED EMBODIMENT

Figure 1:
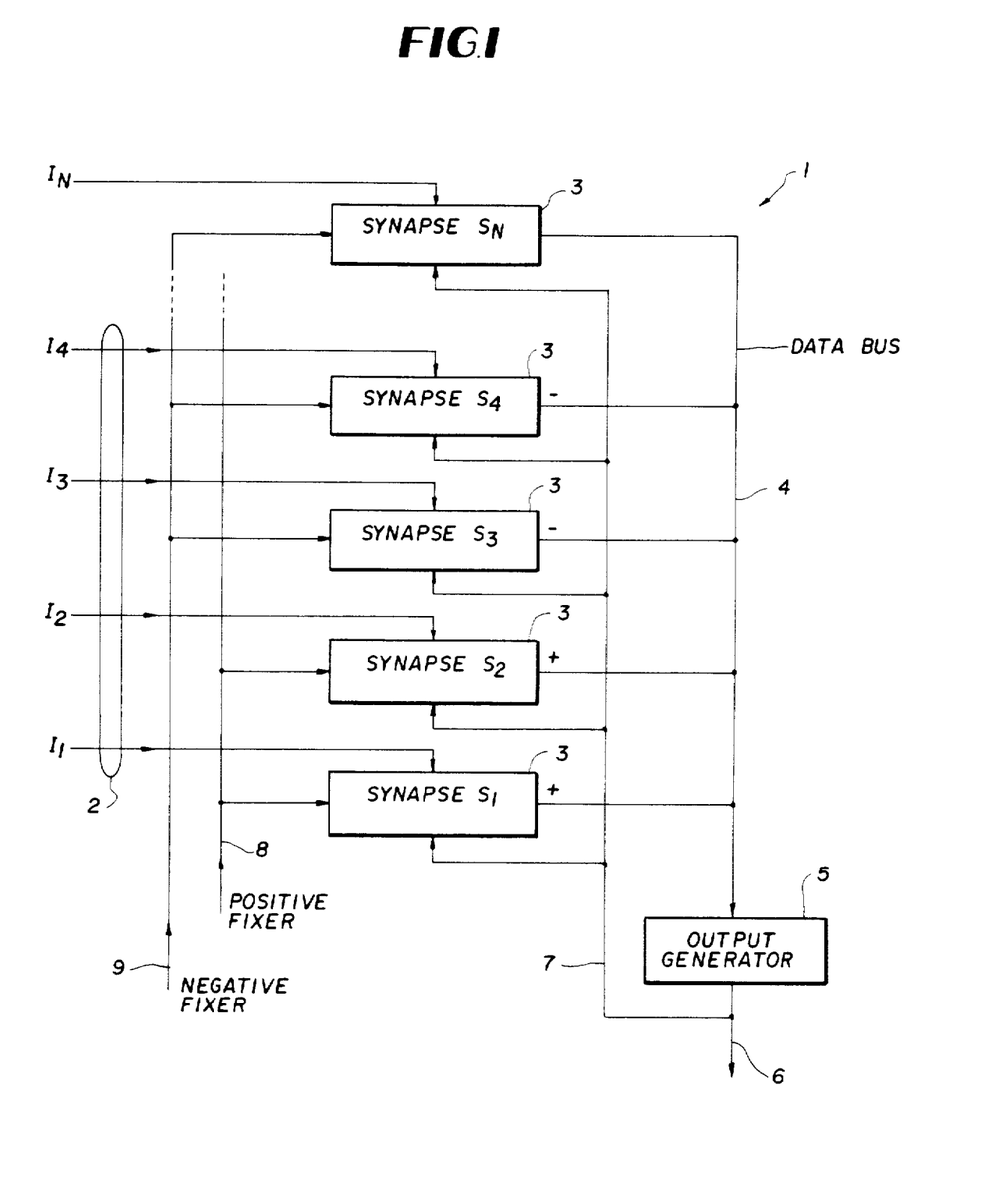
FIG. 1 is a block diagram of a single artificial neuron and the connections leading to other neurons and/or exterior elements to be controlled.

Turning now to a more detailed description of the invention, there is illustrated in FIG. 1, an artificial neuron 1 having a plurality of external inputs 2, identified as input lines I1, I2, . . . In, which are the outputs from sources of external stimulous, such as other neurons and/or sensors (not shown). These inputs are fed to a plurality of corresponding synapses 3, identified as synapses S1, S2, . . . Sn. Associated with each synapse S1 through Sn is a positive (+) or negative (−) sign which designates the synapse as either excitatory (+) or inhibitory (−). Upon receipt of an incoming signal from an external source of stimulus on one of the input lines, the corresponding synapse places a four-bit number representing its synaptic potential, hereinafter called the "synaptic value" onto a data bus 4 connected between synapse and an output generator 5. If the synapse is excitatory, the synaptic value is positive and it is added to a time-varying value stored in the output generator 5. If, on the other hand, the synapse is inhibitory the synaptic value is subtracted from the value stored in the generator. The actual magnitude of the synaptic value is a variable which depends on a variety of conditions to be described hereinafter.

If the synaptic value is positive and if it causes the generator value to exceed a predetermined threshold value, then the output generator will cause one or more neuron output pulse to appear on output line 6. These neuron output pulses may be used to control an effector (e.g., a stepping motor) or may be fed as the input to other neurons at their synapses for further integration. The output pulses are also fed back through line 7 to each synapse of the original neuron 1 where they control changes in the synaptic value.

The neuron 1 has two further inputs, labeled the positive and negative fixers. These inputs are the outputs of separate external systems (which may be composed of other neurons) which control permanent changes in synaptic values. The positive fixer is connected through line 8 to excitatory synapses and the negative fixer is connected through line 9 to inhibitory synapses. Input signals on these lines have the effect of "fixing" the long term value of a synapse.

Figure 2:
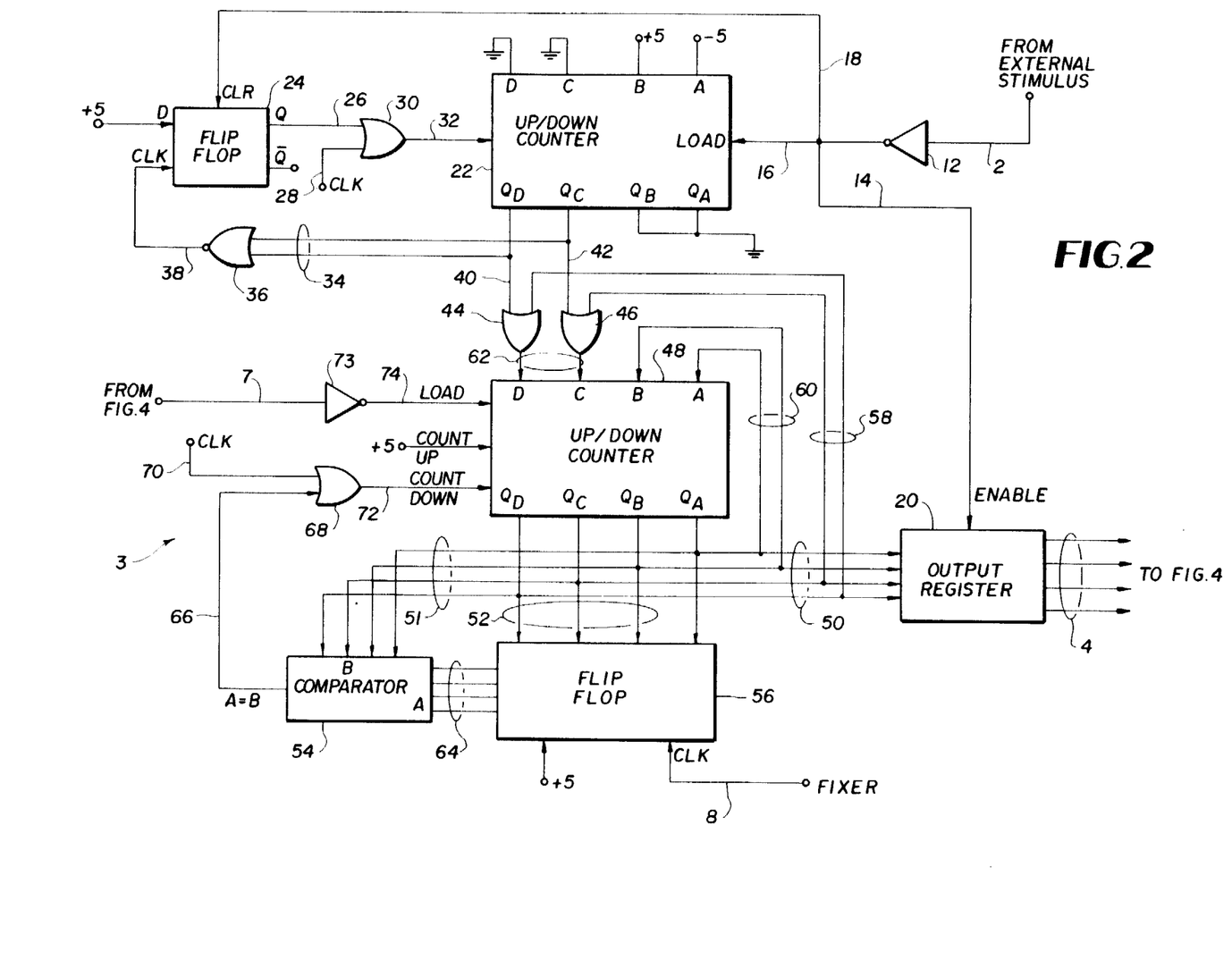
FIG. 2 is a schematic diagram of a preferred embodiment of a synapse for use in the neuron of FIG. 1.

FIG. 2 illustrates the circuitry which forms a single synapse 3 of the artificial neuron 1. The synapse depicted in this figure is an excitatory, or positive synapse, such as the synapse S1 of FIG. 1. Inhibitory or negative synapses are constructed in a similar manner with a few minor variations, to be described.

Connected to the synapse 3 is an input line 2 which connects a source of stimulus (not shown) to an inverter 12 which, in turn, is connected through lines 14, 16 and 18 to the enable input of a buffer register 20, the load input of an up/down counter 22, and the clear input of a flip flop 24, respectively. The Q output of flip flop 24 is connected through a line 26 to one of the inputs of an OR gate 30. Pulses from a clock (not shown) are fed through a line 28 to the other input of OR gate 30 and the output of gate 30 is connected through a line 32 to the count down input of counter 22. The $Q_D$ and $Q_C$ outputs of counter 22 are connected through lines 34 to a NOR gate 36 which in turn is connected through a line 38 to the clock input of flip flop 24. The $Q_D$ and $Q_C$ outputs of counter 22 are also connected respectively to the inputs of a pair of OR gates 44 and 46 by way of lines 40 and 42. The A and B inputs to counter 22 are connected to a bias source of +5 volts while C and D inputs to counter 22 are connected to ground.

When an input pulse occurs on line 2, the binary number 0011 will be loaded into counter 22 because of the counter's fixed inputs on lines A, B, C and D. Similarly, because the D input of flip flop 24 is connected to +5 volts, the occurrence of an input pulse to the flip flop through line 18 will cause the flip flop to clear, thereby putting a binary "0" onto its Q output. When Q goes low, the output of OR gate 30 will be the same as the clock input 28 and the counter will begin counting down from 0011. The counter will continue to count down to 0000, then to 1111, and back to 0011 again. When the output of counter 22 goes from 0100 to 0011, NOR gate 36 makes a low to high transition, thereby triggering flip flop 24 and a binary "1" is clocked to the Q output of flip flop 24, thereby stopping any further count.

The above-described portion of the circuit serves to determine when and how much the synaptic value will be increased if the neuron generates an output signal or fires within a certain time interval after an input pulse is received.

An up/down counter 48 serves to hold the actual four-bit synaptic value which corresponds to the magnitude of the synapse potential. This value may be transferred from the outputs $Q_A$-$Q_D$ of counter 48 through lines 50, 51 and 52 to output register 20, the B inputs of a four-bit comparator 54, and to a flip flop register 56. In addition, the $Q_D$ and $Q_C$ outputs of counter 48 are connected to the second inputs of OR gates 44 and 46, respectively, through lines 58 while the $Q_B$ and $Q_A$ outputs are fed back through lines 60 to the B and A inputs, respectively. The outputs of OR gates 44 and 46 are connected through lines 62 to the D and C inputs, respectively, of counter 48.

The positive fixer line 8 carries a fixer pulse from an external source (not shown) when an action occurs that is considered desirable. This line is connected to the clock input of register 56 while the clear input of register 56 is fixed high at +5 volts. The flip flop 56 has its outputs connected through lines 64 to the A inputs of comparator 54, and the A-B output of comparator 54 is connected through a line 66 to an OR gate 68 which in turn is connected through a line 72 to the count down input of counter 48.

When a input pulse is received on line 2 from the external stimulus, the output register 20 is enabled, and the value currently held in counter 48 will be gated through output register 20 to the generator circuit 5 (FIG. 4) via data bus 4. This input pulse from the external stimulus also initiates the counting down of counter 22. When the neuron 1 fires to produce an output line 6 (FIG. 1), this output will be detected on line 7 and because this line is connected through inverter 73 and line 74 to the load input of counter 48, the load input will go low thus transferring the values appearing at the A through D inputs of the counter 22 to its $Q_A$ and $Q_D$ outputs, respectively.

If the firing of the neuron 1 occurs shortly after the occurrence of the input pulse on line 2, the $Q_D$ and $Q_C$ outputs of counter 22 may be at some value other than 0011, depending on the current count status of that counter. For example, if the current count of counter 22 is 1110, then its $Q_D$ and $Q_C$ outputs will both be 1's. Because of their connections through OR gates 44 and 46 to the D and C inputs of counter 48, the $Q_D$ and $Q_C$ outputs of counter 48 will both becomes 1's upon the occurrence of a fire signal on line 7. Thus, depending on the value currently held in counter 48, the magnitude of the value loaded into counter 48 by the action of the fire signal on line 7 may be greater than the current value which is being held in flip flop register 56. If this is the case, comparator 54 will see a larger number at its B inputs than at its A inputs and the A=B output will go low, thereby causing clock pulses to be fed from clock line 70 through OR gate 68 to the count down input of counter 48. The counter 48 will then continue to count down until it reaches its previous value, (the value held in flip flop register 56) at which time the comparators's A inputs will equal its B inputs and a high output will appear on line 66 to terminate the count down.

If a positive fixer signal should appear on line 8 before counter 48 has counted down to its previous value, the current value of the counter 48 will be loaded into flip flop register 56 by the high signal on line 8 to its clock input. This new value will appear at the Q output lines of register 56 and will be transferred to the A inputs of the comparator 54 by lines 64. Since the two inputs to the comparator 54 are now equal, the A=B line 66 will go high and terminate the count of up/down counter 48. Thus, register 56 serves to set a lower boundary on the value which is in the counter 48 and this lower boundary may be increased but not decreased by providing a pulse on fixer line 8 after the magnitude of the value in counter 48 has been increased but before it has decreased back to its original value.

The above circuitry simulates a synapse which operates according to the theory of synaptic modulation. Specifically, counter 22, flip flop 24 and associated gates 30, 36, 44 and 46 serve to simulate the time dependent synaptic value increase function which is graphically illustrated in FIG. 3 and which will be discussed in detail below. Counter 48, comparator 54 and register 56 serve to simulate the ability of a synapse to have its lower boundary increased upon the reception of a fixer signal; they also provide for the decrease of a synaptic potential back to its original value if no fixer signal is received. This decrease in the synaptic potential is not an exponential function, as it is according to the theory of synaptic modulation, but is a step function dictated by the clock frequency and the counter 48. However, this minor operational difference does not significantly affect the circuit's ability to simulate the desired function.

Inhibitory or negative synapses differ from the excitatory or positive synapses discussed above in three ways. First, counter 48 is adapted to count up instead of down (line 72 is connected to the count up input) and the 1's complement of the binary number corresponding to the magnitude of the synaptic value is utilized. Second, flip flop register 56 is clocked by the negative fixer signal on line 9 (FIG. 1) instead of the positive fixer signal on line 8. Finally, the reception of an input signal from the external stimulus causes a low signal to be sent to the generator 5 on a sign line so that the generator will know that a negative number is being sent on data bus 4. The sign line will be discussed in more detail during the description of the generator circuit shown in FIG. 4.

Figure 3A:
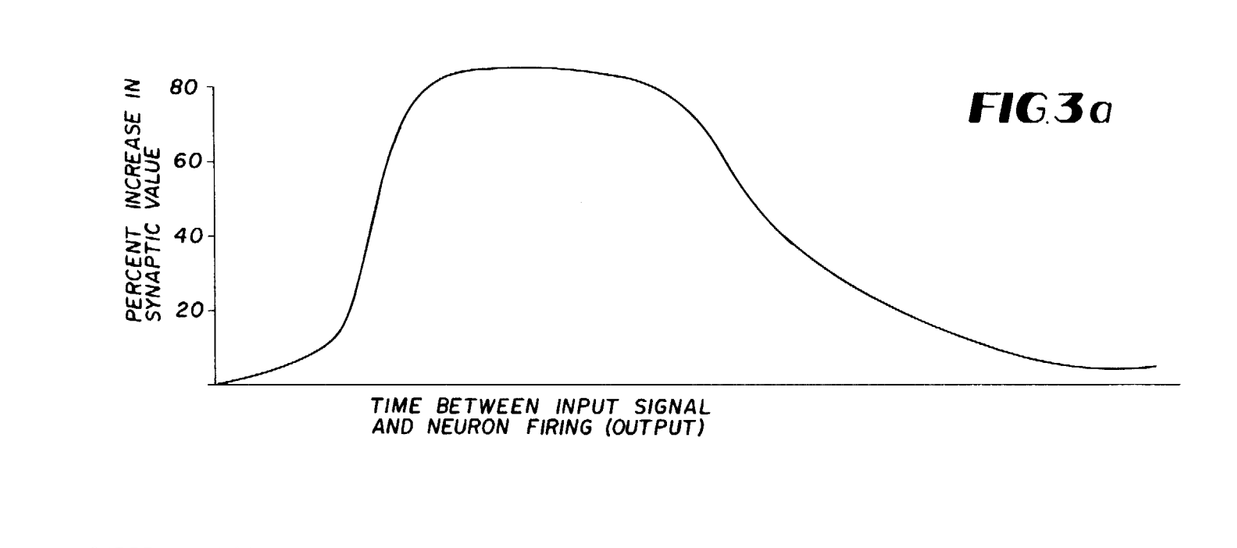
FIG. 3 is a graphical illustration of the theoretical relationship between the increase in synaptic value or efficacy and the time interval between the reception of a presynaptic signal and the firing of the neuron in accordance with the theory of synaptic modulation.

With reference now to FIGS. 3a-3e, the relationships of the synaptic value increases (vertical axis) to the time intervals between the occurrences of input pulses to a synapse and the firing of the neuron (horizontal axis) are illustrated. Specifically, FIG. 3a shows the relationship according to the theory of synaptic modulation, while FIGS. 3b through 3e show the actual relationship obtained with the synapse circuitry of FIG. 2. As previously indicated, this relationship depends not only on time but also on the number (or value) currently held in counter 48.

In FIGS. 3b through 3e, the amount of increase of synaptic value is shown as a number value between 0 and 12, and represents the four-bit digital value (0000 to 1100) which is added to counter 48 upon the occurrence of a fire signal on line 7. The time frame used in these figures is the number of clock pulses which have been received by counter 22 by way line 32 since an input pulse was received on line 2. This is a maximum of 16, since it takes 16 pulses to sequence the four-bit counter 22 through its count.

Figure 3B:
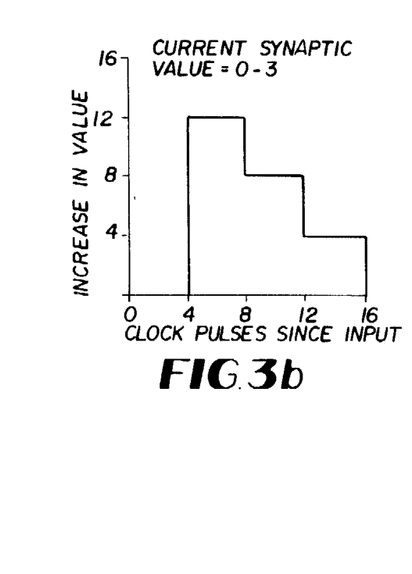
FIGS. 3b to 3e are graphical representations of the actual relationship between the increase in synaptic value and the time that elapses between the reception of an input pulse and the firing of the generator as obtained from the circuitry of FIG. 1.
Figure 3C:
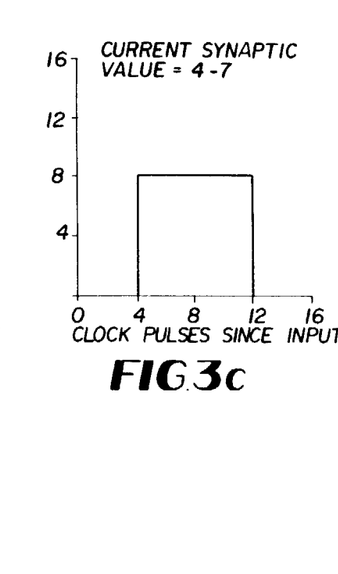
Figure 3D:
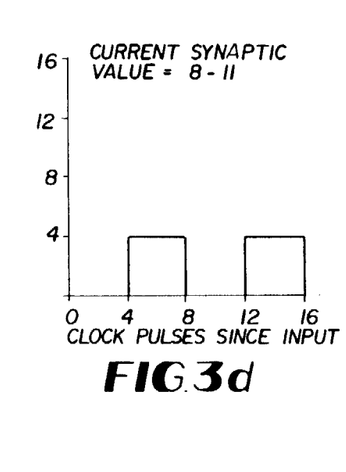
Figure 3E:
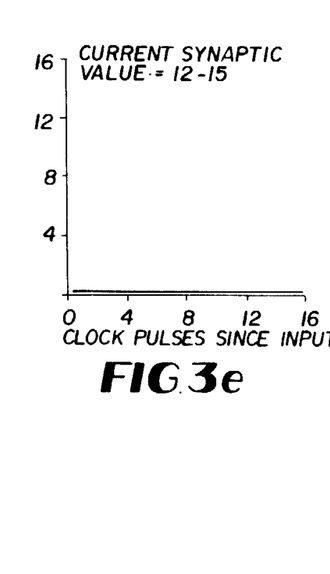

A comparison of FIG. 3a to FIGS. 3b through 3e shows that although the actual relationships do not exactly replicate the theoretical, the critical feature of providing a window or time interval during which the synaptic value may have its magnitude increased as a function of time is sufficiently replicated by the actual functions so that the circuit will adequately simulate this aspect of the theory of synaptic modulation.

Figure 4:
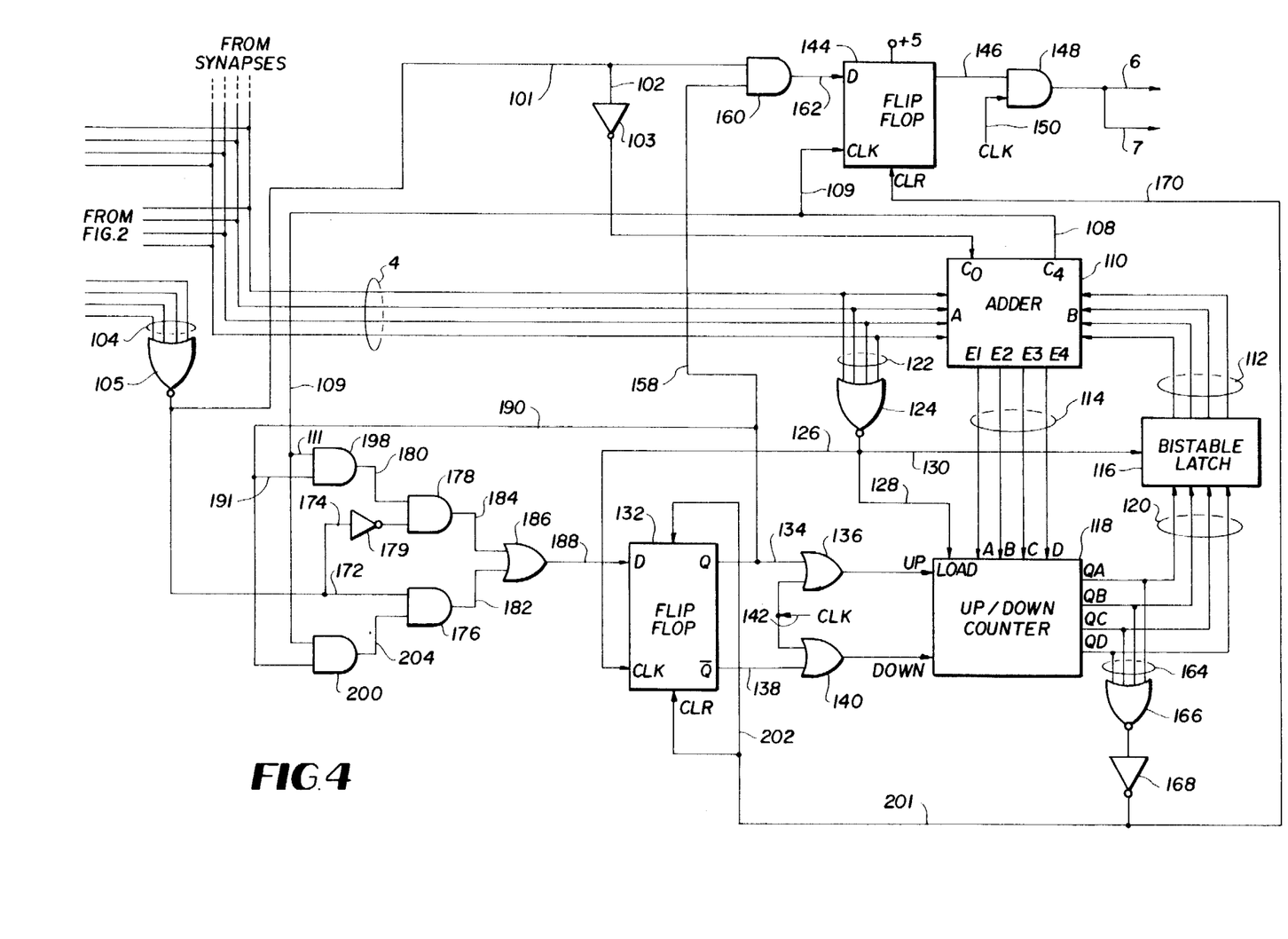
FIG. 4 is a schematic diagram of a preferred embodiment of a generator circuit for use in the neuron of FI. 1.

Referring now to FIG. 4, there is shown a preferred circuit for the generator 5 of the preferred embodiment of the invention. In that figure data bus 4, which leads from the output registers 20 of one or more synapses 3, is connected to the A inputs of four-bit adder 110. The outputs $\Sigma 1$ to $\Sigma 4$ of the adder are connected through lines 114 to the data inputs A, B, C and D of an up-/down counter 118 which holds the sum of the incoming synaptic potentials and continually counts back toward zero, as will be shown. Outputs $Q_A$-$Q_D$ of counter 118 are connected through lines 120 to the inputs of a four-bit bistable latch 116 whose outputs are, in turn, connected through lines 112 to the B inputs of adder 110.

An input signal or value arriving from a synapse on data bus 4 is also fed through line 122 to a NOR gate 124, the output of which is connected through lines 126, 128 and 130 to the clock input of flip flop 132, and load input of counter 118, and the enable input of latch 116, respectively. When an input signal or value appears on data bus 4 which is other than 0, the output of NOR gate 124 will go low, thus disabling latch 116 and enabling the load input of counter 118. The number currently in counter 118 which is held in latch 116 is added to the incoming synaptic value by adder 110 and the sum is placed on lines 114 and loaded into counter 118. After the lines of the data bus 4 go back to 0, the output of NOR gate 124 will go high, thus disabling the load input of counter 118 and causing this counter to immediately begin counting back toward 0 from this new value. At the same time, bistable latch 116 is reenabled so that its output again tracks the output of counter 118.

A sign line 101 is connected through a line 102 and an inverter 103 to the Co input of adder 110. Each of the neuron's inhibitory (negative) synapses have their input lines 2 connected to one of the inputs 104 of a multiple input NOR gate 105. The output of the NOR gate is connected to the sign line 101 so that sign line 101 only goes low upon the occurrence of an input pulse to any one of the inhibitory synapses. At all other times, the sign line 101 remains high and accordingly the sign line provides an indication to the generator of whether the input signals are from an inhibitory synapse. It should be noted that although a four-input NOR gate 105 is shown in FIG. 4 and would thus indicate a maximum of 4 inhibitory synapses, this gate is merely exemplary, and it should be understood that any number of inhibitory synapses can be connected to sign line 101 by utilizing appropriate logic gates to simulate the functioning of a NOR gate having the desired number of inputs.

When the sign line goes low, indicating that a negative number is on data bus 4, the Co input to adder 110 goes high, which causes a 1 to be added to the sum of the A and B inputs. Because negative numbers are represented by inhibitory synapses in 1's complement form, this has the effect of converting that number to 2's complement form and performing the 2's complement addition of that number with the number at the B inputs of the adder. This subtracts the magnitude of the number on data bus 4 from the number currently held in counter 118.

The above circuitry serves to replicate the function of neurons known as temporal and spatial summation. Adder 110 and latch 116 serve to add incoming synaptic values to the value currently in the generator, while counter 118 serves continually to decay this sum back toward a resting potential, which in this case is 0. As in the synapse circuit, this decay is a decreasing (or increasing in the case of a negative value) step function which, while differing from the theoretical exponential decay function, does not appreciably affect the circuit's ability to function as desired.

The remaining circuitry of FIG. 3 serves to determine when the neuron will generate an output signal, or fire, and to determine in which direction counter 118 should be counting, based on the sign and magnitude of the value currently in the counter and the value coming from a synapse on data bus 4. In particular, a flip flop 132 is provided to set the direction of count for counter 118. The Q output of the flip flop 132 is connected through a line 134 and an OR gate 136 to the count up input of the counter, while the $\overline{Q}$ output of the flip flop is connected through a line 138 and an OR gate 140 to count down input of the counter. A source of clock pulses (not shown) is connected to the second inputs of gates 136 and 140 through line 142. In this manner, when the Q output of flip flop 132 is a logic 1, the counter will count down and when the Q output of the flip flop is logic 0, the counter will count up. The specific input circuitry to flip flop 132 will be discussed below.

A second flip flop 144 is utilized to control the firing of the neuron. The Q output of this flip flop is connected through a line 146 to the first input of an AND gate 148. A source of clock pulses (not shown) is connected to the other input of the AND gate through a line 150. The output of the AND gate 148 constitutes the fire output of the neuron and appears on output lines 6 and 7. This output line is connected to all of the synapses of neuron 1 by way of line 7 as shown in FIGS. 1 and 3. In addition, the output may be connected to the inputs of other neurons and/or to effector mechanisms such as servo motors.

The C4 (fourth bit carry) output of adder 110 is connected through lines 108 and 109 to the clock input of the flip flop 144. The carry output goes high only if a carry is generated by the adder when the numbers at the A and B inputs are summed. This enables the D input of the flip flop to be gated to the Q output 146 only when a carry is generated by the adder. Sign line 101 and a line 158 from the Q output of flip flop 132 are connected to an AND gate 160 which, in turn, is connected through a line 162 to the D input of flip flop 144. As stated before, the sign line is at a logic 1 level when a positive number is on data bus 4 and is at a logic 0 level when a negative number is on the input lines. In addition, the Q output of flip flop 132 is at a logic 1 level when counter 118 is not counting up (i.e., is counting down or not counting) and is at a logic 0 level when counter 118 is counting up. Thus, in order for the D input to the flip flop 144 to be at a logic 1 level, a positive number must be on data bus 4 and counter 118 must not be counting up, which means it must not contain a negative number.

The firing of the neuron thus occurs only when a carry is generated by the adder 110 and this carry is the result of the addition of two positive numbers.

It should be noted that since the subtraction of negative numbers is performed by 2's complement addition, the addition of a negative number to either a positive number or another negative number may generate a carry signal on line 109 which would not be an indication that the threshold of the generator has been exceeded. This is the reason that the Q output of the flip flop 144 is raised high only when two positive numbers are added and a carry is generated; this is the only true indication that the positive threshold value (1111) of the generator has been exceeded.

Once the output of flip flop 144 goes high, fire (neuron output) pulses will continue to be generated by the clock source on line 150 through gate 148 onto line 6 until the flip flop is cleared. The circuitry which controls the clearing of flip flop 144 includes the output of counter 118 which is connected by way of lines 164 to the input of a four input NOR gate 166 which, in turn, is connected to the input of an inverter gate 168. The output of gate 168, which is 0 only when the output of counter 118 is at 0 to indicate that it is at its resting potential, is connected through a line 170 to the clear input of flip flop 144. When line 170 goes low, the Q output of flip flop 144 goes low and the neuron ceases firing. This occurs only when counter 118 has counted back down to 0 (resting potential).

Accordingly, the number of output pulses which are generated when the neuron fires is a function of the amount by which the generator exceeds threshold. For example, if adder 110 adds the positive numbers 1111 and 1111, the result will be 1110 with a carry out of bit 4. The neuron will begin firing when this occurs but at the same time, 1110 will be loaded into counter 118, which will then begin counting this number back down to zero. In order for the neuron to cease firing, counter 118 must reach 0, which in this case will take 14 clock pulses. Assuming that the clock which controls counter 118 is the same as the clock which controls the firing of the neuron, 14 output pulses will thus be generated. In a similar manner, if adder 110 adds 1111 and 0001, a carry will be generated and 0001 will be loaded into counter 118. This value will only take 1 clock pulse to count down to zero so that only 1 output pulse will be generated when these two values are summed.

Returning now the circuitry which controls the direction of count of counter 118, line 172 connects the sign line 101 to the first input of an AND gate 176. Line 174 connects the sign line 101 to an inverter 179 which in turn is connected to one of the inputs of an AND gate 178. The second input of AND gate 178 is connected through line 180 to the output of an AND gate 198. The second input of AND gate 176 is connected through line 204 to the output of OR gate 200. Lines 182 and 184 connect the outputs of gates 176 and 178, respectively, to the inputs of an OR gate 186, which in turn has its output connected through a line 188 to the D input of flip flop 132. Lines 190 and 191 connect the Q output of flip flop 132 to AND gate 198 and OR gate 200. Lines 108, 109 and 111 connect the C4 carry bit output of adder 110 to the other inputs of AND gate 198 and OR gate 200. The output of inverter 168 is connected through lines 201 and 202 to the clear and preset inputs of flip flop 132, respectively.

When the counter 118 has counted back to 0, the output of inverter gate 168 will go low which will drive both the preset and the clear inputs of the flip flop 132 low, thus causing a logic 1 to appear on both its Q and $\overline{Q}$ outputs. This will have the effect of preventing counter 118 from the counting in either direction. Thus, once the counter reaches its resting potential (0), it will cease counting.

A change in the direction of count will only occur when another synaptic value is added to the present generator value. In every case but one, as will be shown, a positive synaptic value will result in a positive sum and the count will be down. Similarly, in every case but one, a negative synaptic value will result in an up count. The sign line connects to the two AND gates 176 and 178 in such a manner that a positive sign enables gate 176 and disables (sets low) gate 178. Conversely, a negative value on the sign line enables gate 178 and disables gate 176. Therefore the D input of flip flop 132 is determined by the output of AND gate 176 if the sign line is positive and gate 178 if the sign line is negative.

If the sign line is positive, the output of gate 176 depends in turn on the output of OR gate 200. This will be high unless both the 44 carry bit and the Q output of flip flop 132 are low. This occurs if the count is up and no carry is generated by the addition occurring in adder 110. This can only occur, given a positive synaptic value on the data bus 4, if a small positive synaptic value was added to a larger negative value ready in the up/down counter 118. Under these circumstances, the sum will remain negative and the output of OR gate 200 will be low, driving the output of AND gate 176 low, which will in turn (given the low output of AND gate 178 due to the positive sign line) put the output of OR gate 186 low. Then a low will be on the D input of flip flop 132 when NOR gate 124 goes high, clocking a low to the Q output of flip flop 132 and causing the count to remain up.

In other cases when a positive synaptic value is added, if the count is already down, Q lines 190 and 191 are already high, which in turn insures a high input to the D input and a continued down count. If the count is up and a carry is generated, this will keep the output of OR gate 200 high and result in the appropriate down count.

If a negative synaptic value is added to the generator, again, in every case but one the sum will be negative and the count should be up. However, if a large positive number is already in the generator (and hence the count is down and Q line 190 is high) when a small negative number (a large value in two's complement form) is added, the sum will be positive and the count should remain down. This is accomplished as follows: When the sign line goes low, it enables AND gate 178. Its output then depends upon the output of AND gate 198. If and only if the Q line is high and a carry is generated then the output of AND gate 198 will be high and this will in turn eventually cause the count to become down. In other cases, the output of AND gate 198 will be low, insuring a low is clocked into flip flop 132 and subsequently generating an up count.

The elements of the circuitry set forth in FIGS. 2 and 4 above may be, for example, TTL integrated circuit chips as listed below:

| Circuit Element | TTL Circuit |
| --- | --- |
| 12, 106, 168, 196 | 7404 inverter |
| 20 | 74125 quad buffer with three state outputs |
| 22, 48, 118 | 74193 4-bit synchronous up/down counter |
| 24, 132, 144 | 7474 D type flip flop |
| 30, 44, 46, 68, 136, 140, 186 | 7432 2 input OR gate |
| 36 | 7404 2 input NOR gate |
| 54 | 7485 4-bit magnitude comparator |
| 56 | 74175 quad D type flip flops |
| 110 | 7483 4-bit binary adder |
| 116 | 7475 4-bit bistable latch |
| 105, 124, 166 | 7425 4 input NOR gate |
| 148, 160, 176, 178, 204 | 7408 2 input AND gate |
| 198 | 7411 3 input AND gate |

The use of the above TTL circuit chips in the circuits of FIGS. 2 and 4 is only by way of example and it should be understood that other equivalent integrated circuits may be utilized without altering the operation of either the synapses or generator circuits.

Figure 5:
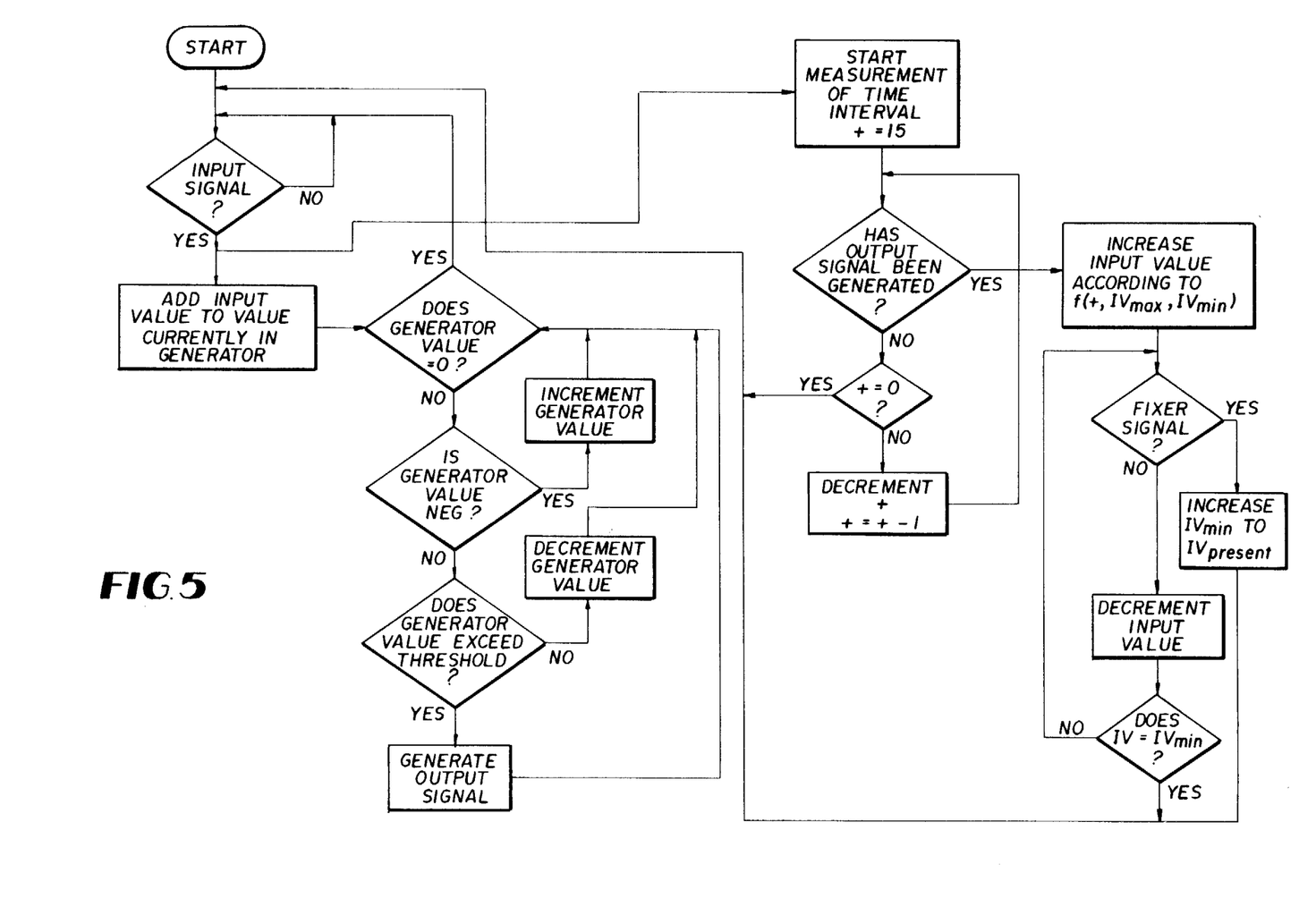
FIG. 5 is a flow chart which represents the method of operation of the preferred embodiment of the invention.

FIG. 5 is a flow diagram which depicts the basic method of operation of the artificial neuron circuit described with respect to FIGS. 2 and 4, and illustrates the operation of the neuron as it applies to a single synapse. Other synapses of the neuron operate independently of each other in following this process.

At the start of the process, the input 2 to the synapse 3 is monitored until an input pulse is detected. When an input is detected, buffer register 20 gates the current synaptic value onto data bus 4 and thus to the input of generator 5, where adder 110 adds the synaptic value to the value currently in the generator.

After this, the value stored in generator 5 is checked and if it is zero, the process will start over and the input of the synapse will again be monitored. If however, the value in the generator is negative, up/down counter 118 will begin counting up (incrementing) until the generator value is 0, at which point, as before, the process will start over. Should the generator value be positive, it will be checked, by means of the carry output C4 of adder 110, to see if it has exceeded threshold. If so, an output signal will be generated through output line 6 in the form of a train of pulses. If not, the up/down counter will count down (decrement) until the value in the generator reaches 0.

Meanwhile, the occurrence of an input pulse on input 2 also initiates the measurement of a predetermined time interval, or period of eligibility for synaptic increase, by up/down counter 22. If no output signal from the generator 5 appears on line 7 during this time interval, then no signal will be supplied to the load input of counter 48, the process will start over, and no increase in synaptic value will occur. On the other hand, if an output signal does occur on line 7 during this time interval, the counter 48 will receive a load signal and will transfer the current value of counter 22 to counter 48. The synapse's value thus will be increased by an amount which is a function of the current synaptic value, the upper limit on that value, and the point in the time interval at which the output signal occurs.

After the synapse has had its value increased, this new value, stored in counter 48, will begin to decay back to its original value through the counting down of up/down counter 48. If a fixer signal arrives on line 8 during this countdown period, and is supplied to the clock input of flip flop register 56, this decay will be halted, the value in counter 48 at the time of arrival of the fixer signal will be retained in counter 48, and the synaptic value will be permanently increased.

The overall process shown diagrammatically in FIG. 5 involves a number of parallel processes. Although the circuitry set forth in FIGS. 2 and 4 performs all of these operations simultaneously, a computer which operates sequentially, cannot do so. A computer program nonetheless has been formulated in accordance with the process of FIG. 5 and has been shown to exhibit a learning capability which is very similar to that of actual neurons. A computer is able to do this because of the great speed with which it performs the necessary operations. Thus, simultaneous operations such as the monitoring of the inputs to all of the synapses can be carried out by the computer with only very small inaccuracies which in real time are not discernable. The computer program which simulates the operation of the artificial neuron set forth herein by following the flow diagram of FIG. 5 is included at the end of this description as an Appendix.

Figure 6:
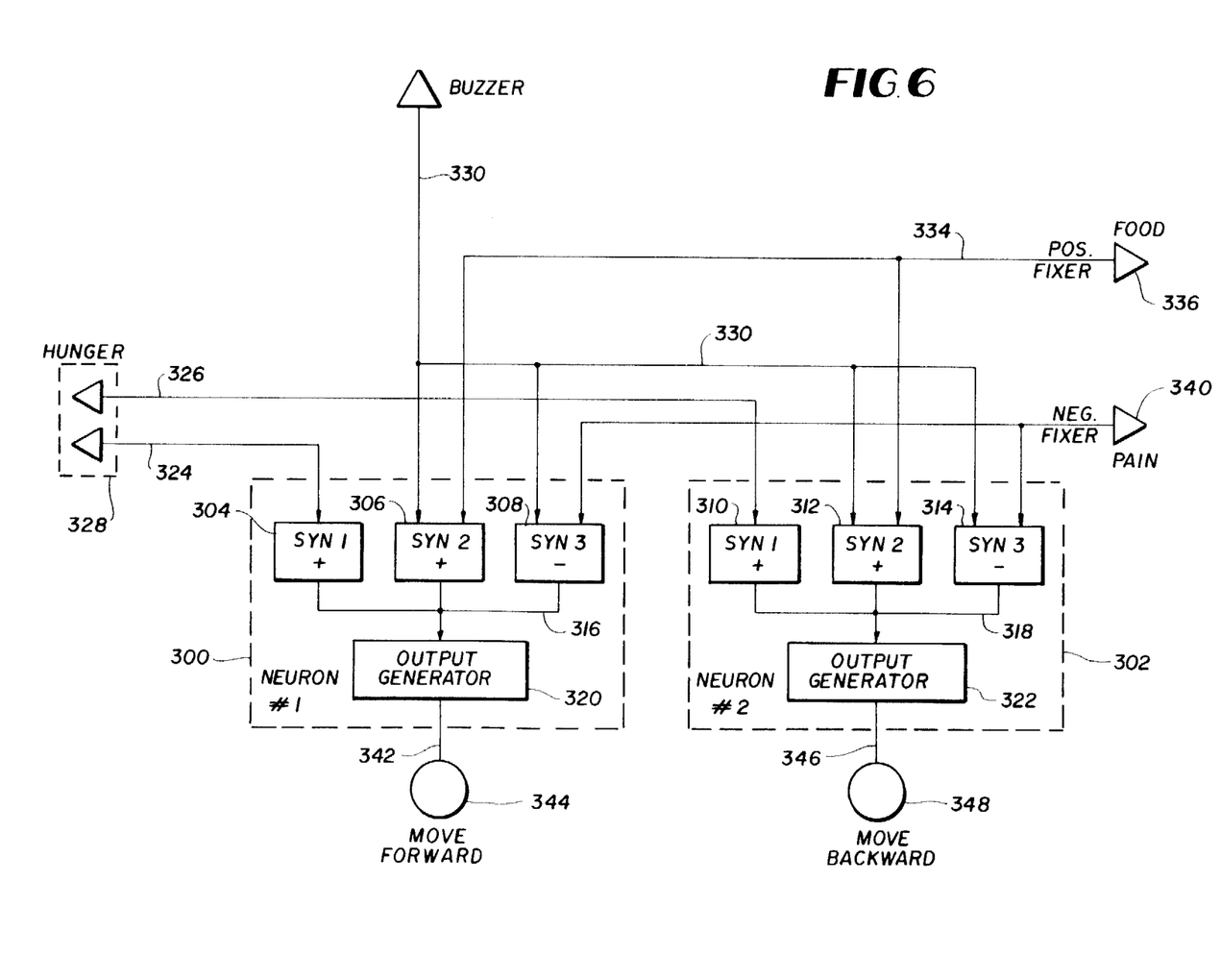
FIG. 6 is a block diagram of a simple nervous system which is made up of 2 artificial neurons.

In FIG. 6 there is illustrated a simple nervous system which is comprised essentially of two neurons, 300 and 302, each constructed in accordance with the preferred embodiment of the invention. Each of these neurons has three synapses, 304, 306 and 308, and 310, 312 and 314, respectively, which are connected through corresponding data buses 316 and 318 to output generators 320 and 322, respectively. The synapses of the neurons are constructed in accordance with FIG. 2, while the generators are constructed in accordance with FIG. 4.

Synapses 304 and 310 of neurons 300 and 302, respectively, have their inputs connected via lines 324 and 326 to, for example, a hunger stimulus 328. The hunger stimulus provides positive pulses at random and the rate at which these pulses occurs increases as the hunger of the simulated organism increases. In addition, the hunger stimulus discriminates between the two neurons 300 and 302, sending input pulses to one or the other but never to both at the same time. For the purposes of this explanation it should be noted that synapses 304 and 310 differ from the synapse shown in FIG. 2 in that their synaptic values are fixed. This may be accomplished simply by loading a set value into counter 48 and permanently disabling its count down input by disconnecting the output of OR gate 68 from the same and connecting a source of +5 volts to line 72.

Synapses 306, 308, 312 and 314 each have their inputs connected through lines 330 to a buzzer stimulus, 332. Each time the buzzer sounds, two sequential positive pulses are gated to the inputs of these synapses. In addition, synapses 306 and 312 each have their fixer inputs connected through a positive fixer line 334 to a source of a positively valued stimulus 336, e.g., food. These two synapses are, therefore, designated as excitatory synapses. In a similar manner, synapses 308 and 314 each have their fixer inputs connected through a negative fixer line 338 to a source of negatively valued stimulus 340, e.g., pain. These synapses are thus designated as inhibitory synapses.

The output of neuron 300 is connected through line 342 to an effector mechanism 344 which causes the simulated organism to move forward while the output of neuron 302 is connected through line 346 to an effector mechanism 348 which causes the simulated organism to move backwards. When the sum of the synaptic values in the generator 320 of neuron 300 exceeds threshold (1111), one or more output pulses will be generated and the simulated organism will move forward. Similarly, when the sum of the synaptic values in the generator 322 of neuron 302 exceeds threshold, an output will be generated and the simulated organism will move backward.

The operation of the simple nervous system illustrated in FIG. 6 may be shown to exhibit learning ability according to the theory of synaptic modulation as follows: Suppose first that the synaptic value of synapses 304 and 310 is at a permanent high value, say 10 (1010). A pulse produced by the hunger stimulus 328 would thus produce a generator potential of this magnitude in one of the neurons 300 or 302. Since this generator potential decays with time, if it happens that a second pulse is generated by the hunger stimulus shortly after the first, then a generator potential exceeding threshold (1111) may be generated, resulting in firing of the neuron. What happens next depends on the environment established for the system.

Suppose, for example, it is desired to "teach" the simulated organism to move forward in response to a buzzer stimulus. Each time the buzzer sounds, a pair of pulses are sent from buzzer stimulus 332 through lines 330 to synapses 306, 308, 312 and 314. The synaptic values of these synapses will then be added to the generator potential in their corresponding output generators, 320 or 322. It should be noted that since the buzzer stimulus causes a pair of pulses to be sent to the synapses, their corresponding synaptic values will be added to the generators twice. Originally, these synaptic values are equal to 0, so that the buzzer stimulus has no effect. Each time the buzzer sounds however, the counters 22 of each of the synapses 306, 308, 312 and 314 begin to cycle through their counting sequences to institute a period of "eligibility" for synaptic increase.

If neither neuron 300 or 302 generates an output within the proper time frame, i.e., within the period of "eligibility", there will be no increase in synaptic value, and the buzzer stimulus continues to have no effect. However, if on one occasion after the buzzer sounds to activate synapses 306, 308, 312 and 314, an input from the hunger stimulus 328 appears on line 326 within the period of eligibility for synapses 312 and 314, and if that hunger stimulus to synapse 310 causes neuron 302 to fire, then the conditions for causing a temporary increase in synaptic value have been met, and synapses 312 and 314 of neuron 302 will have their values increased, as discussed with respect to FIG. 2.

Because the firing of neuron 302 causes the organism to move backward and the organism will be fed only if it moves forward, it would not be fed under these conditions, and there would be no positive fixer signed (food) generated. Since the increase in synaptic value for synapses 312 and 314 is temporary, these would soon decay back to their original values of 0. It will be noted also that since the excitatory and inhibitory synapses, 312 and 314 respectively, would have their values increased an equal amount, but in opposite directions, the buzzer stimulus along has no discernable effect on the neuron, even if sounded during the period of temporary elevation in synaptic value.

If it is supposed that on another occasion shortly after the buzzer sounds, a hunger stimulus coincidentally appears on line 324 to fire neuron 300 and move the simulated organism forward, then synapses 306 and 308 of neuron 300 would both have their synaptic values increased by some amount, depending on the time delay between the buzzer and hunger stimuli, since the conditions for reinforcement would have been met. The food stimulus would then be presented as a "reward" for moving forward, and this would result in a pulse on the positive fixer line 334 of neurons 300 and 302. This positive fixer signal halts the decay in the synaptic value of synapse 306 of neuron 300, but synapse 308, the inhibitory synapse, is unaffected and will continue to decay back to zero. This will leave synapse 306 with a larger synaptic value than before, and the simulated organism has started the "learning" process.

After the activation of the positive fixer, sounding the buzzer causes the addition of a larger positive synaptic value to the generator potential of neuron 300, and each repetition of the sequence: buzzer; go forward; food; results in an increase in the synaptic value of synapse 306 of neuron 300 until presentation of the buzzer will elicit the go forward behavior either by itself or with even the slightest input from the hunger stimulus 328, at which time it can be said that the simulated organism has been taught to move forward upon a buzzer stimulus.

It should be noted that according to FIG. 3, if the behavior occurs too quickly after synapse is activated, there will be no increase in synaptic value. The result of this condition is that if a single synapse becomes capable of singly causing the neuron to fire, no further increase in synaptic value will occur.

Even with this simple nervous system other learning is possible. For example, if the pain stimulus is presented after a buzzer-behavior sequence, an increase in the synaptic value of an inhibitory synapse results, so that the buzzer would inhibit the selected behavior, making it unlikely to occur. As the number of neurons and their interconnections are increased, the capabilities of the simulated organisms are multiplied.

Artifical neurons which are constructed in accordance with the theory of synaptic modulation using the circuits of FIGS. 2 and 4 may be incorporated into an artificial nervous system of any size and learning capability and will closely simulate the behavioral and learning functions of real organisms. It is also contemplated that these artifical neurons may even be interfaced with actual neurons, and as such would constitute true artificial neurons.

Although the invention has been illustrated in terms of a preferred embodiment, it will be understood that numerous variations and modifications can be made by those of skill in the art without departing from the true spirit and scope of the inventive concept as set forth in the following claims.

APPENDIX

```
#4:LAZARUS1.TEXT
(*$S++*)
PROGRAM LEARNING;
USES APPLESTUF, TURTLEGRAPHICS;
CONST MAXSTIM=11;
      MAXBEHAVIOR=7;
      DECREMENT=2;
      CALORIES=9;
      THRESHOLD=900;
      EFFORT=1;
      SYNPMAX=100;
      STIMMAX=10;
      HURT=0.3;
TYPE PSP= -200..200;
     NEURON = ARRAY[1..MAXSTIM] OF
              PSP;
     MEMTYPE = ARRAY [1..MAXBEHAVIOR]
               OF NEURON;
     STIMARRAY = ARRAY[1..MAXSTIM] OF
                 INTEGER;
     PSPSUM = ARRAY[1..MAXBEHAVIOR]
              OF INTEGER;
VAR ENERGY, CONSEQUENCE:INTEGER;
    REINF, PSPCHANGE:REAL;
    SHORTMEM, LONGMEM:MEMTYPE;
    STIMULUS:STIMARRAY;
    BEHAVIOR:PSPSUM;
    PRINTER:TEXT;
    OLDX, OLDY: INTEGER;
    ISTR: STRING;
    RESP:CHAR;
    READYTOQUIT: BOOLEAN;

PROCEDURE PELLET;
VAR I, N, MOVESIZE: INTEGER;

PROCEDURE FOODPELLET(X, Y: INTEGER;
                     COLOR: SCREENCOLOR);
VAR I, OLDANG, OLDX, OLDY: INTEGER;
BEGIN
  OLDANG:=TURTLEANG;
  OLDX:=TURTLEX; OLDY:=TURTLEY;
  PENCOLOR(NONE);
  MOVETO(X, Y);
  PENCOLOR(COLOR);
  FOR I:=1 TO 6 DO
    BEGIN
      TURN(60);
      MOVE(3);
    END;
  PENCOLOR(NONE);
  MOVETO(OLDX, OLDY);
  TURNTO(OLDANG);
END; (*FOODPELLET*)

PROCEDURE CREATE;
VAR I, J:INTEGER;
    BRAIN7:TEXT;
BEGIN
  RESET(BRAIN7, 'BRAIN7.TEXT');
  FOR I:=1 TO MAXBEHAVIOR DO
    FOR J:=1 TO MAXSTIM DO
BEGIN
  MOVESIZE:=5;
  FOR I:=1 TO 15 DO
    BEGIN
      FOODPELLET(10*I, 100, WHITE);
      FOODPELLET(10*I, 100, BLACK);
    END;
END; (*PELLET*)
  BEGIN
    READ(BRAIN7, SHORTMEM[I, J]);
    LONGMEM[I, J]:=SHORTMEM[I, J];
  END;
  ENERGY:=50;
  FOR I:=1 TO MAXBEHAVIOR DO
    BEHAVIOR[I]:=0;
  FOR J:=1 TO MAXSTIM DO
    STIMULUS[J]:=0;
  INITTURTLE;
  RANDOMIZE;
END; (*CREATE*)

PROCEDURE MOUSE (COLOR: SCREENCOLOR);
VAR OLDANG, OLDX, OLDY: INTEGER;
BEGIN
  (*SAVE TURTLE PARAMETERS, TO LEAVE
    TURTLE IN SAME LOCATION AND ORIEN-
    TATION AFTER PROCEDURE END*)
  OLDANG:=TURTLEANG;
  OLDX:=TURTLEX; OLDY:=TURTLEY;
  PENCOLOR (NONE); MOVE (20);
  PENCOLOR (COLOR);
  TURN (90); MOVE (2);
  TURN (60); MOVE (5);
  TURN (300); MOVE (6);
  TURN (90);
  PENCOLOR (NONE);
  MOVE (1); TURN (90);
  MOVE (5); TURN (240);
  PENCOLOR (COLOR);
  MOVE (10); TURN (30);
  MOVE (35); TURN (90);
  MOVE (1); TURN (90);
  MOVE (7); TURN (270);
  MOVE (18); TURN (270);
  MOVE (7); TURN (90);
  MOVE (1); TURN (90);
  MOVE (35); TURN (30);
  MOVE (10); TURN (240);
  PENCOLOR (NONE);
  MOVE (5); TURN (90);
  MOVE (1); TURN (90);
```

```
  PENCOLOR (COLOR);
  MOVE (5); TURN (300);
  MOVE (5); TURN (30);
  MOVE (2); TURN (90);
  (*RESTORE PREVIOUS LOCATION AND ORIEN-
    TATION OF TURTLE*)
  PENCOLOR (NONE);
  MOVETO(OLDX,OLDY); TURNTO(OLDANG);
END; (*MOUSE*)

PROCEDURE LEARN (VAR SYNAPSE:NEURON);
VAR J: INTEGER;
BEGIN
  FOR J:= 8 TO MAXSTIM DO
  BEGIN
    IF( STIMULUS[J]>0)AND
      (SYNAPSE[J]> 0) AND
      (SYNAPSE[J]<SYNPMAX)
      THEN SYNAPSE[J]:= SYNAPSE[J]
        + ROUND(PSPCHANGE*STIMULUS[J]*
        (SYNPMAX-SYNAPSE[J]));
    IF( STIMULUS[J]>0)AND
      (SYNAPSE[J]< 0) AND
      (ABS(SYNAPSE[J])<SYNPMAX)
      THEN SYNAPSE[J]:= SYNAPSE[J]
        - ROUND(PSPCHANGE*STIMULUS[J]*
        (SYNPMAX+SYNAPSE[J]));
  END; (*DO*)
END; (*LEARN*)

PROCEDURE TURNLEFT;
VAR DUMMY:INTEGER;
BEGIN
  FOR DUMMY:= 1 TO 5 DO
    BEGIN
      MOUSE(BLACK);
      TURN(18);
      MOUSE(WHITE);
    END;
  PSPCHANGE:=0.06;
  LEARN(SHORTMEM[5]);
END; (*TURNLEFT*)

PROCEDURE TURNRIGHT;
VAR DUMMY:INTEGER;
BEGIN
  FOR DUMMY:= 1 TO 5 DO
    BEGIN
      MOUSE(BLACK);
      TURN(-18);
      MOUSE(WHITE);
    END;
  PSPCHANGE:=0.06;
  LEARN (SHORTMEM[6]);
END; (*TURNRIGHT*)

PROCEDURE FORWD;
VAR DUMMY: INTEGER;
BEGIN
  FOR DUMMY:= 1 TO 5 DO
    BEGIN
      MOUSE(BLACK);
      MOVE(4);
      MOUSE(WHITE);
    END;
  PSPCHANGE:=0.06;
  LEARN (SHORTMEM[4]);
  STIMULUS[11]:=14;
END; (*FORWD*)

PROCEDURE BACKWARD;
VAR DUMMY:INTEGER;
BEGIN
  FOR DUMMY:=1 TO 5 DO
    BEGIN
      MOUSE(BLACK);
      MOVE(-4);
      MOUSE(WHITE);
    END;
  PSPCHANGE:=0.06;
  LEARN (SHORTMEM[7]);
END; (*BACKWARD*)

PROCEDURE PLEASURE;
VAR I,J: INTEGER;
BEGIN
  ENERGY:=ENERGY + ROUND(CALORIES*REINF);
  FOR I:=4 TO MAXBEHAVIOR DO
    FOR J:=8 TO MAXSTIM DO
    BEGIN
      IF LONGMEM[I,J] > 0 THEN
        LONGMEM[I,J]:=LONGMEM[I,J] +
          ROUND(REINF*(SHORTMEM[I,J]
          -LONGMEM[I,J]));
      IF LONGMEM[I,J] > SYNPMAX THEN
        LONGMEM[I,J]:=SYNPMAX;
    END; (*DO*)
  PSPCHANGE:=0.06;
  LEARN(SHORTMEM[1]);
END; (*PLEASURE*)

PROCEDURE PAIN;
VAR I,J: INTEGER;
BEGIN
  FOR I:=4 TO MAXBEHAVIOR DO
    FOR J:=8 TO MAXSTIM DO
    BEGIN
      IF LONGMEM[I,J] < 0 THEN
        LONGMEM[I,J]:=LONGMEM[I,J] -
          ROUND(HURT*(LONGMEM[I,J]
          -SHORTMEM[I,J]));
      IF ABS(LONGMEM[I,J])>SYNPMAX
        THEN LONGMEM[I,J]:=-SYNPMAX;
```

```
      END; (*DO*)
      PSPCHANGE:=0.05;
      LEARN(SHORTMEM[2]);
    END; (*PAIN*)
    PROCEDURE UCR;
    VAR DUMMY:INTEGER;
    BEGIN
      FOR DUMMY:= 1 TO 4 DO
        BEGIN
          MOUSE(BLACK);
          TURN(45);
          MOUSE(WHITE);
        END;
      PSPCHANGE:=0.05;
      LEARN(SHORTMEM[3]);
    END; (*UCR*)
    PROCEDURE LIGHT (COLOR:SCREENCOLOR);
    VAR J,OLDANG,OLDX,OLDY:INTEGER;
    BEGIN
      OLDANG:=TURTLEANG;
      OLDX:=TURTLEX; OLDY:=TURTLEY;
      MOVETO(0,165); TURNTO(0);
      PENCOLOR (COLOR);
      FOR J:=1 TO 10 DO
        BEGIN
          MOVE(4);
          TURN(9);
        END;
      PENCOLOR (NONE);
      MOVETO(OLDX,OLDY);
      TURNTO(OLDANG);
    END; (*LIGHT*)
    PROCEDURE LOOK;
    VAR I,J,DUMMY,PELLNUMB:INTEGER;
        ANYBEHAVIOR:BOOLEAN;
    BEGIN
      FOR J:=1 TO MAXSTIM DO
        IF STIMULUS[J]>3 THEN STIMULUS[J]:=
          STIMULUS[J]-4 ELSE STIMULUS[J]:=0;
      CONSEQUENCE:=PADDLE(0);
      IF CONSEQUENCE>138 THEN
      BEGIN
        STIMULUS[5]:=STIMMAX;
        REINF:=(CONSEQUENCE-138)/117;
        PELLNUMB:=ROUND(3*REINF);
        IF PELLNUMB>0 THEN FOR I:=1 TO PELLNUMB
          DO PELLET;
      END; (*IF>138*)
      IF CONSEQUENCE<100 THEN
      BEGIN
        STIMULUS[6]:=STIMMAX;
        FILLSCREEN(REVERSE);
        FILLSCREEN(REVERSE);
        NOTE(50,20);
      END;
      IF BUTTON(0) THEN STIMULUS[7]:=STIMMAX;
      IF BUTTON(1) THEN
      BEGIN
        STIMULUS[10]:=STIMMAX;
        NOTE (16,80);
      END;
      IF PADDLE(1)>127 THEN
      BEGIN
        STIMULUS[8]:=STIMMAX; (*EXCITATORY*)
        STIMULUS[9]:=STIMMAX; (*INHIBITORY*)
        LIGHT (WHITE);
      END
      ELSE LIGHT (BLACK);
      FOR J:= 1 TO 4 DO
      BEGIN
        STIMULUS[J]:=(50-2*ENERGY+RANDOM
          MOD(1+2*ENERGY));
        IF STIMULUS[J]<1
          THEN STIMULUS[J]:=0;
      END; (*STIMULUS DO*)
      FOR I:=4 TO MAXBEHAVIOR DO
        FOR J:=8 TO MAXSTIM DO
        BEGIN
          IF SHORTMEM[I,J]>LONGMEM[I,J] THEN
            SHORTMEM[I,J]:=SHORTMEM[I,J]-
              (SHORTMEM[I,J]-LONGMEM[I,J])
              DIV DECREMENT;
          IF SHORTMEM[I,J]<LONGMEM[I,J] THEN
            SHORTMEM[I,J]:=SHORTMEM[I,J]-
              (SHORTMEM[I,J]-LONGMEM[I,J]+4)
              DIV DECREMENT;
        END; (*DECAY DO*)
      FOR I:=1 TO MAXBEHAVIOR DO
      BEGIN
        FOR J:=1 TO MAXSTIM DO
          IF STIMULUS[J]>0 THEN
            BEHAVIOR[I]:=BEHAVIOR[I]+
              SHORTMEM[I,J]*STIMULUS[J];
        IF BEHAVIOR[I]>THRESHOLD THEN
        BEGIN
          CASE I OF
            1: PLEASURE;
            2: PAIN;
            3: UCR;
            4: FORWD;
            5: TURNLEFT;
            6: TURNRIGHT;
            7: BACKWARD;
          END; (*CASES*)
          ENERGY:=ENERGY-EFFORT;
          ANYBEHAVIOR:=TRUE;
        END; (*IF*)
        BEHAVIOR[I]:=0;
        IF ANYBEHAVIOR THEN
        BEGIN
          ANYBEHAVIOR:=FALSE;
          EXIT (LOOK);
        END;
      END; (*I-DO*)
    END; (*LOOK*)
```

```
PROCEDURE SAVE;
VAR I, J : INTEGER;
    CH, RESP : CHAR;

BEGIN
    READ(CH);
    WRITELN('DO YOU WANT TO SEE THE SHORT MEMORY?'
    READ(RESP);                                                     10
    IF RESP='Y' THEN
    BEGIN
        FOR I:=1 TO MAXBEHAVIOR DO
        BEGIN                                                       15
            WRITELN;
            FOR J:=1 TO MAXSTIM DO
            WRITE(SHORTMEM[I,J]:4);
        END; (*FOR*)                                                20
    END; (*IF SHORTMEM*)
    WRITELN;
    WRITELN('DO YOU WANT TO SEE THE LONG MEMORY'
    READ(RESP);
    IF RESP='Y' THEN                                                25
    BEGIN
        FOR I:=1 TO MAXBEHAVIOR DO
        BEGIN
            WRITELN;                                                30
            FOR J:=1 TO MAXSTIM DO
            WRITE(LONGMEM[I,J]:4);
        END; (*FOR*)
    END; (*IF LONGMEM*)                                             35
    BEGIN (*MAIN PROGRAM*)
        CREATE_MOUSE(WHITE);
        REPEAT
            REPEAT                                                  40
                LOOK;
            UNTIL (KEYPRESS) OR (ENERGY<5);
            TEXTMODE;
            WRITELN;                                                45
            SAVE;
            IF ENERGY>=5 THEN
            BEGIN
                WRITELN;                                            50
                WRITELN('REVIVE THE MOUSE?');
                READ(RESP);
                READYTOQUIT := RESP <> 'Y';
                GRAFMODE;                                           55
            END;
        UNTIL READYTOQUIT;
        WRITELN;
        WRITELN('THE MOUSE DIED!!');                                60
    END.
```

I claim:

1. A method for simulating the operation of a neuron comprising:

(a) monitoring a plurality of inputs corresponding to external stimuli for the neuron;

(b) producing, upon the occurrence of a stimulus on one of said inputs a corresponding synaptic value signal;

(c) adding said synaptic value to a storage means to thereby accumulate a generator value in said storage means;

(d) generating a neuron output signal if said accumulated generator value exceeds a threshold value;

(e) continuously changing said accumulated generator value toward a resting value;

(f) measuring a predetermined time interval following the occurrence of said stimulus;

(g) increasing the magnitude of said corresponding synaptic value from a first level to a second level if said neuron output signal is generated within said predetermined time interval;

(h) continuously decreasing the magnitude of said synaptic value from said second level back toward said first level until the magnitude of said synaptic value equals said first level; and (i) selectively supplying a fixer signal to stop the decrease in magnitude of said synaptic value, whereby if said fixer signal occurs before said magnitude has reached said first level, said magnitude will be permanently increased.

2. The method of claim 1, wherein the accumulation of a generator value comprises adding said corresponding synaptic value having a magnitude dependent upon the time interval between succeeding stimuli, whereby the generation of said neuron output signal is a function of the magnitude of said corresponding synaptic value and of the time between succeeding external stimuli on any of said plurality of inputs.

3. The method of claim 2, wherein the step of generating a neuron output signal includes producing a pulse train when said accumulated generator value exceeds a threshold value, the number of pulses in said train being dependent on the time required to return said accumulated generator value to said resting value, and thus being dependent on the magnitude of said accumulated generator value.

4. The method of claim 3, wherein the step of increasing the value of said corresponding synaptic value comprises:

generating a timing signal having a value which varies through said predetermined time interval;

modifying the value of said corresponding synaptic value in accordance with the value of said timing signal and the current synaptic value to increase said corresponding synaptic value to said second level upon the occurrence of said neuron output signal, the magnitude of said timing signal value depending on the time interval between the occurrence of the stimulus, which produces said corresponding synaptic value and the firing of said neuron.

5. A neuron simulator, comprising:

at least one synapse simulator means having an input for receiving a stimulus which then generates as an output, a synaptic value, each said synapse simulator means including means for storing said synaptic value and means for varying said synaptic value depending upon the temporal relationship between said input and the output of said neuron simulator; and generator means having an input connected to the output of each said synapse simulator means, said generator means including means responsive to successive inputs from said at least one synapse simulator means to produce an accumulated generator value which decays with time toward a rest value, said generator means having an output which produces a neuron output signal whenever said accumulated generator value exceeds a predetermined threshold value.

6. The neuron simulator of claim 5, wherein said means for varying said synaptic value includes means responsive to a stimulus for producing in said synapse simulator means a time-varying signal and means responsive to said neuron output signal to modify said synaptic value in accordance with the value of said time-varying signal and the current synaptic value to change said synaptic value from a first level to a second level.

7. The neuron simulator of claim 6, wherein said means for varying said synaptic value further includes means for returning said synaptic value from said second level toward said first level.

8. The neuron simulator of claim 7, further including means for fixing said synaptic value at a level between said first and second levels to thereby establish a new synaptic value.

9. The neuron simulator of claim 8, wherein said means for fixing said synaptic value comprises signal means representing a desired neuron response, whereby the neuron simulator acquires an accumulated generator value which tends to produce a neuron output upon receipt of selected input stimuli.

10. The neuron simulator of claim 9, wherein said generator means includes:
 storage means for storing a generator value;
 means for decaying said generator value toward a rest value over a predetermined period of time;
 means for adding to the current generator value the synaptic value produced by a synapse simulator means upon receipt of a stimulus to thereby produce an accumulated generator value which will produce a neuron output whenever it exceeds said threshold value; and
 means for transferring said accumulated generator value to said storage means for decay and subsequent addition to a synaptic value produced by a subsequent stimulus.

11. The neuron simulator of claim 10, wherein said generator means includes:
 means responsive to an accumulated generator value in excess of said threshold value for producing a neuron output signal, said signal comprising a pulse train having a number of pulses corresponding to the magnitude of said accumulated generator value.

12. The neuron simulator of claim 5 which further comprises:
 at least a first excitatory synapse simulator means which generates a positive synaptic value upon reception of a stimulus;
 at least a first inhibitory synapse simulator means which generates a negative synaptic value upon reception of a stimulus;
 means for varying the magnitudes of each of said positive and negative synaptic values, said means including means responsive to a stimulus for producing in each said positive and negative synapse simulator means a time-varying signal and means responsive to said neuron output signed to modify the magnitude of said positive and negative synaptic values in accordance with the value of said time-varying signal and the current magnitude of said positive and negative synaptic values to change the magnitudes of said positive and negative synaptic values from a first level to a second level;
 means for returning the magnitude of each said positive and negative synaptic values from said second level forward said first level;
 positive fixing means for fixing the magnitude of said positive synaptic value at a level between said first and second levels, said positive fixing means comprising signal means representing a desired neuron response;
 negative fixing means for fixing the magnitude of said negative synaptic value at a level between said first and second levels, said negative fixing means comprising signal means representing an undesired neuron response;
 means to add the magnitude of said positive synaptic value to the accumulated generator value; and
 means to subtract the magnitude of said negative synaptic value from the accumulated generator value, whereby desired neuron responses will tend to cause said accumulated generator value to exceed said predetermined threshold value and thereby cause said generator means to produce a neuron output signal, and undesired neuron response will tend to cause said accumulated generator value to stay less than said predetermined threshold value, and thereby prevent said generator means from producing a neuron output signal.

* * * * *